Figure 1:
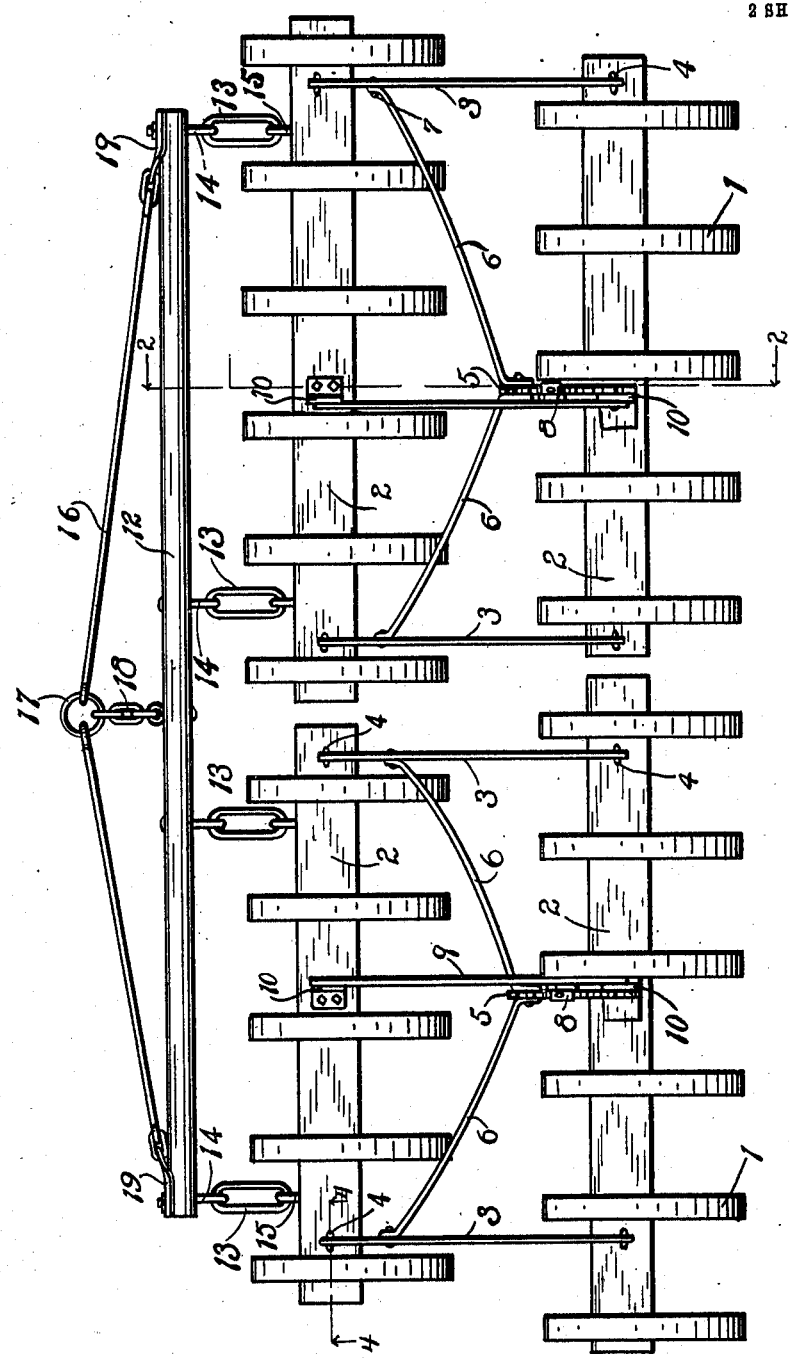

D. POLLEY.
HARROW.
APPLICATION FILED DEC. 1, 1909.

970,747.

Patented Sept. 20, 1910.
2 SHEETS—SHEET 1.

Witnesses
F. Gertrude Tallman
Elora E. Braden

Inventor
David Polley
By Chappell & Earl
Attorneys

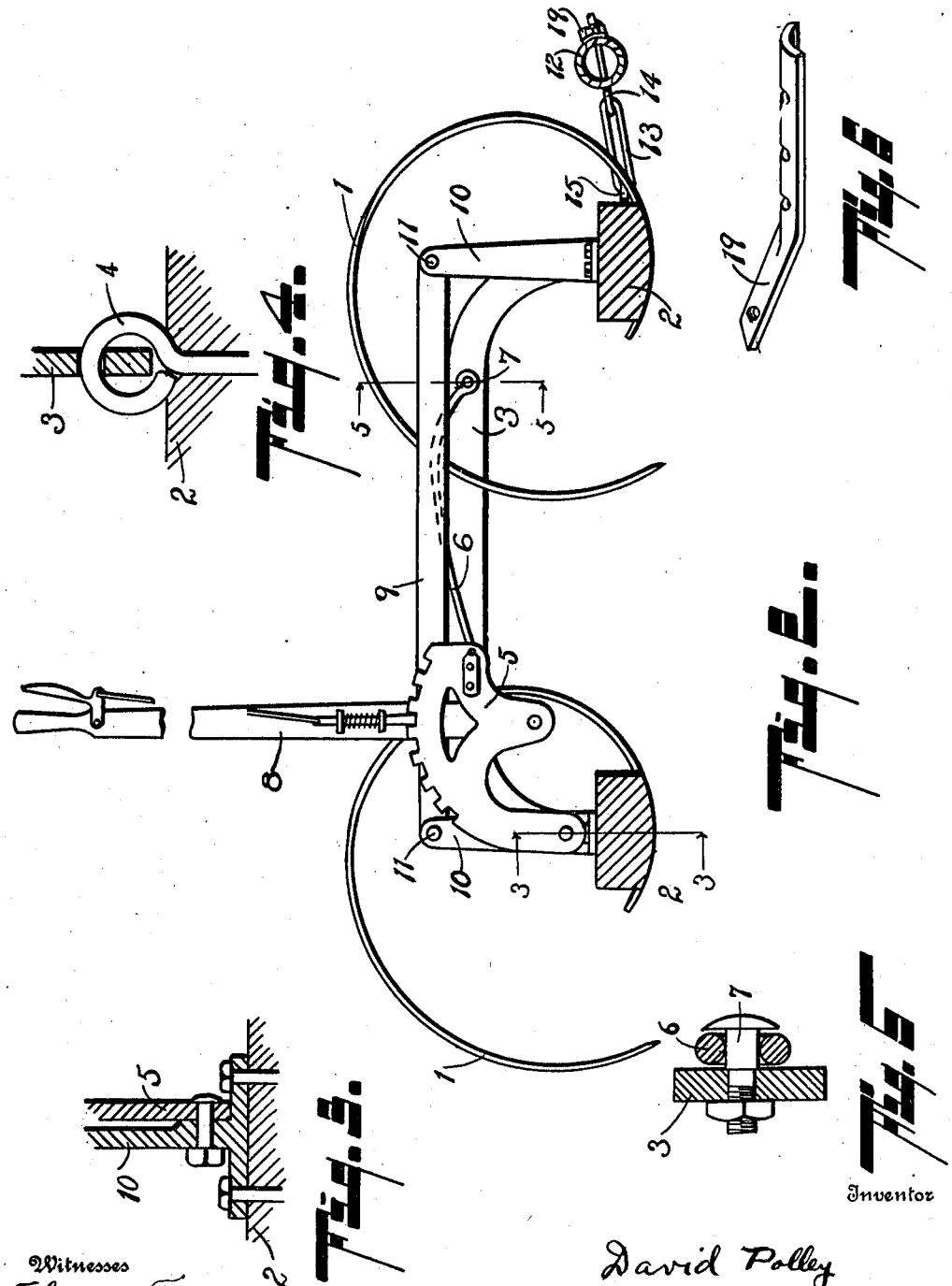

UNITED STATES PATENT OFFICE.

DAVID POLLEY, OF VICKSBURG, MICHIGAN.

HARROW.

970,747.　　　　Specification of Letters Patent.　　Patented Sept. 20, 1910.

Application filed December 1, 1909. Serial No. 530,744.

*To all whom it may concern:*

Be it known that I, DAVID POLLEY, a citizen of the United States, residing at Vicksburg, Michigan, have invented certain new and useful Improvements in Harrows, of which the following is a specification.

This invention relates to improvements in harrows.

The main objects of this invention are, first, to provide an improved harrow which readily passes over stones and other objects, and one which does not clog and readily frees itself from trash. Second, to provide an improved harrow in which the teeth do not trail. Third, to provide an improved harrow embodying these advantages which is very simple and economical in structure and durable in use.

Further objects and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a plan view of a structure embodying the features of my invention. Fig. 2 is an enlarged vertical section thereof, taken on a line corresponding to line 2—2 of Fig. 1. Fig. 3 is an enlarged detail vertical section taken on a line corresponding to line 3—3 of Fig. 2. Fig. 4 is an enlarged detail vertical section illustrating the connection for the links 3 to the tooth bar. Fig. 5 is an enlarged detail section taken on a line corresponding to line 5—5 of Fig. 2. Fig. 6 is a perspective view of the coupling plate 19.

In the drawings similar reference characters refer to similar parts throughout the several views, and the sectional views are taken looking in the direction of the little arrows at the ends of the section lines.

Referring to the drawings, the teeth 1 of the structure illustrated are of the C-spring type. These teeth are secured to the tooth bar 2 in any suitable manner. The bars 2 are arranged in pairs substantially parallel. Each pair of bars is connected by a pair of links 3, the links being pivotally connected to bars preferably by means of eye bolts 4. (See Fig. 4.) The links are arched at their ends and curved downwardly, so that trash or the like readily passes under the same. On the rear bar I mount the rack or segment 5, the rack being disposed between the links 3, it being preferably centrally located, as illustrated, and arranged to project forwardly from the bar.

A pair of braces 6 is provided for holding the bars 2 parallel. These braces are curved upwardly to clear the teeth and to provide clearance for rubbish or trash. The rear ends of the bar 6 are rigidly secured to the forward end of the rack, while their forward ends are pivotally secured to the links 3. This I preferably accomplish by pivot bolts 7, the bolts loosely engaging the braces to permit a rocking movement of the tooth bars relative to each other, as well as a free vertical movement.

The adjusting lever 8 is pivotally mounted on the rack and is connected to the tooth bars by means of the link 9 and the upwardly projecting arms 10 on the tooth bars, the link being secured to these arms by means of the pivots 11, and being also pivotally secured to the lever. This connection holds the bars in their adjusted position, at the same time permitting free movement thereof, so that they readily pass over trash, stones, or other like objects.

I preferably provide the draft device illustrated, which consists of the draft bar 12, which is secured to the forward bars 2 by means of an effectual coupling consisting of the rings 13 and the eye bolts 14 and 15. These couplings are arranged adjacent to the forward ends of the links 3 so that a straight draft is had. To insure the straight draft on the draw bar 12, a pair of draft bars 16 is provided, the outer ends of the draw bars being connected to the outer end of the draft bar, their inner ends being connected to a draft ring 17. This draft ring is connected to the central part of the draw bar by means of a flexible connection, as the chain 18. The draft bars 16 are preferably adjustably connected to the draft bar 12 and this I accomplish in the structure illustrated by providing the coupling plates 19 with a plurality of holes through which the eye bols 14 may be arranged.

My improved harrow has all the advantages of the so-called flexible harrows, at the same time the teeth are held in their proper engaging relation and may be adjusted to any position desired within the scope of their adjustment. This adjustment does not affect the freedom of movement of the tooth bars.

My improved harrow readily passes over obstructions such as stones, and readily frees itself from trash, and at the same time is effective and of comparatively light weight and draft. Owing to the arrangement of the bars and teeth and the draft connections, it is quite impossible that the teeth should trail.

I have illustrated and described my improvements in detail in the preferred embodiment thereto. This structure may be very greatly varied in structural details without departing from my invention, but as these variations will readily appear to those skilled in the art to which this invention relates, I have not attempted to illustrate the same herein.

Having thus described my invention, what I claim as new and desire to secure by Letters Patent is:

1. In a harrow, the combination with the teeth of a pair of tooth bars arranged substantially parallel, one behind the other; connecting links for said bars, said links having downwardly turned ends pivotally connected to said bars; an adjusting rack secured to the rear bar to project forwardly therefrom, said rack being disposed between said links; upwardly curved, forwardly diverging braces rigidly secured to said rack at their rear ends, their forward ends being pivotally secured to said bar connecting links; an adjusting lever pivoted on said rack; upwardly projecting arms on said bars; a link pivotally connected to said arms and to said lever; and a draft device connected to the forward bar adjacent to the forward ends of said bar connecting links.

2. In a harrow, the combination with the teeth of a pair of tooth bars arranged substantially parallel, one behind the other, connecting links for said bars pivotally connected thereto; an adjusting rack secured to the rear bar to project forwardly therefrom, said rack being disposed between said links; braces rigidly secured to said rack at their rear ends, their forward ends being pivotally secured to said bar connecting links; an adjusting lever pivoted on said rack; upwardly projecting arms on said bars; and a link pivotally connected to said arms and to said lever.

3. In a harrow, the combination with the teeth of a pair of tooth bars arranged substantially parallel, one behind the other; connecting links for said bars pivotally connected thereto; an adjusting rack secured to the rear bar to project forwardly therefrom, said rack being disposed between said links; braces rigidly secured to said rack at their rear ends, their forward ends being pivotally secured to said bar connecting links; an adjusting lever pivoted on said rack; upwardly projecting arms on said bars; a link pivotally connected to said arms and to said lever; and a draft device connected to the forward bar adjacent to the forward ends of said bar connecting links.

4. In a harrow, the combination with the teeth of a pair of tooth bars arranged substantially parallel, one behind the other; connecting links for said bars pivotally connected thereto; an adjusting rack carried by the rear bar; braces having a rigid connection with said rack and a pivotal connection with the front bar; an adjusting lever; upwardly projecting arms on said bars; and a link pivotally connected to said arms and to said lever.

5. In a harrow, the combination with the teeth of a pair of tooth bars arranged substantially parallel, one behind the other; connecting links for said bars pivotally connected thereto; an adjusting rack carried by the rear bar; braces having a rigid connection with said rack and a pivotal connection with the front bar; an adjusting lever; and a connection for said lever to said bars, whereby said bars are held adjustably in position and independent movement thereof permitted.

6. In a harrow, the combination with the teeth of a pair of tooth bars arranged substantially parallel, one behind the other; connecting links for said bars pivotally connected thereto; braces having a rigid connection with one of said bars and a pivotal connection with the other; an adjusting lever; upwardly projecting arms on said bars; and a link pivotally connected to said arms and to said lever.

7. In a harrow, the combination with the teeth of a pair of tooth bars arranged substantially parallel, one behind the other; connecting links for said bars pivotally connected thereto; braces having a rigid connection with one of said bars and a pivotal connection with the other; an adjusting lever; and a connection for said lever to said bars adapted to hold said bars adjustably in position and to permit the independent movement thereof.

In witness whereof, I have hereunto set my hand and seal in the presence of two witnesses.

DAVID POLLEY. [L. S.]

Witnesses:
JAMES P. PORTER,
FRANK BROCKWAY.